United States Patent [19]

Stuart

[11] Patent Number: 4,912,343
[45] Date of Patent: Mar. 27, 1990

[54] ELECTROMAGNETIC ACTUATOR

[75] Inventor: Keith O. Stuart, Cypress, Calif.

[73] Assignee: Aura Systems, Inc., El Segundo, Calif.

[21] Appl. No.: 319,956

[22] Filed: Mar. 7, 1989

Related U.S. Application Data

[63] Continuation-in-part of Ser. No. 238,925, Aug. 31, 1988.

[51] Int. Cl.⁴ .................. H02K 41/00; H02K 33/18
[52] U.S. Cl. ........................... 310/14; 310/12; 310/30
[58] Field of Search .............. 310/12, 13, 14, 30, 310/34, 35

[56] References Cited

U.S. PATENT DOCUMENTS

| | | | |
|---|---|---|---|
| 3,558,936 | 1/1971 | Horan | 310/328 X |
| 4,318,023 | 3/1982 | O'Neill | 310/328 |
| 4,434,968 | 3/1984 | Smith | 310/12 |
| 4,612,467 | 9/1986 | Clegg | 310/27 |
| 4,769,569 | 9/1988 | Stahluth | 310/328 |
| 4,808,874 | 2/1989 | Stahluth | 310/328 |

FOREIGN PATENT DOCUMENTS

| | | | |
|---|---|---|---|
| 0077684 | 5/1985 | Japan | 310/328 |
| 0084978 | 5/1985 | Japan | 310/328 |
| 60-118749 | 5/1987 | Japan | |
| 60-118750 | 5/1987 | Japan | |
| 0217880 | 9/1987 | Japan | 310/328 |
| 0608206 | 4/1978 | U.S.S.R. | 310/328 |

Primary Examiner—Patrick R. Salce
Assistant Examiner—Judson H. Jones
Attorney, Agent, or Firm—Schiller, Pandiscio & Kusmer

[57] ABSTRACT

An improved electromagnetic actuator assembly is described. The assembly comprises a magnetic circuit for defining radially directed flux both in an inward and outward direction, and a coil disposed in the flux paths and connect to receive a control signal so that a current can be applied in one direction through those portions of the coil disposed in the inward radially directed flux, and applied in the opposite direction through those portions of the coil disposed in the outwardly directed flux so that the flux/current products of the coil portions and associated flux are additive.

19 Claims, 6 Drawing Sheets

ELECTROMAGNETIC ACTUATOR

The present application is a continuation-in-part of U.S. Ser. No. 238,925 filed Aug. 31, 1988.

The present invention relates generally to electromagnetic actuator systems, and more particularly to an improved electromagnetic actuator assembly capable of providing relatively large output forces in response to relatively low level electrical input signals.

Electromagnetic actuators are well known. In many applications the output force of the actuator is controlled by and a function of an electrical control signal and as such can be used in a variety of applications. Such actuators include linear actuators, as well as angular actuators and can be employed in numerous applications. For example, as described in U.S. patent application Ser. No. 200,025, filed May 27, 1988 and assigned to the assignee of the present application (hereinafter referred to as the "Prior Application"), a linear actuator is employed as part of an electromagnetic strut assembly in an active suspension system for controlling the level and orientation of a chassis of a motor vehicle relative to the vehicle frame.

The active suspension system described in the Prior Application includes four such electromagnetic strut assemblies (one for each wheel) for controlling the orientation of the chassis relative to the frame of the vehicle. Each strut assembly comprises a force transmitting device, in the form of a linear actuator, coaxially mounted and axially movable with respect to a single permanent cylindrical magnet. An electrical coil is wound around the magnet. One end of the strut assembly is coupled to the chassis of the motor vehicle, while the other end f the assembly is coupled to the wheel so that the strut member is movable with respect to the coil and magnet in response to relative movement between the chassis and wheel. The relative movement imparted between the strut member and the coil is a function of desired restorative force, which as described in the Prior Application is a function of the acceleration and deceleration forces applied along the axis and the relative positions of the chassis and frame along the axis. Accordingly, the assembly shown and described in the Prior Application, generates the control signal as a function of the acceleration and deceleration forces applied along the axis and the relative positions of the chassis and frame along the axis so that the chassis is stabilized. As a result, the vehicle provides a smooth ride combining the attributes of a soft ride of a luxury car and the stability of a sport car.

While the active suspension system described in the Prior Application has many advantages, it has been found that using a single cylindrical magnet in the magnetic circuit of the linear actuator of each strut assembly as described requires an excessive amount of current in order to provide the maximum amount of required restorative force at the output of each strut assembly. By way of example, a 1988 Chevrolet Corvette weighs approximately 2800 pounds (1271.2 kilograms). The required amount of current necessary to maintain the chassis of a 1988 Chevrolet Corvette level during a 0.91 g turn is estimated to be approximately 120 amps for each strut. Further, since a magnetic field of relatively high flux density is required, a suitable magnetic material must be provided, such as a neodymium-iron-boron alloy. However, such material is extremely expensive, heavy, and contributes greatly to the overall cost of the strut assembly.

Accordingly, it is an object of the present invention to provide an improved actuator assembly which reduces or overcomes the above-noted problems.

Another general object of the present invention is to provide an improved electromagnetic actuator assembly capable of providing relatively large output forces in response to relatively small level control signals.

And another object of the present invention is to provide an improved electromagnetic actuator assembly which is relatively lighter in weight than the prior art type of actuator described above.

Still another object is to provide an improved electromagnetic linear actuator assembly which can be utilized in an electromagnetic strut assembly of the type described in the Prior Application.

Yet another object of the present invention is to reduce the required level of control current and the amount of magnetic material required for each electromagnetic strut assembly of the type described in the Prior Application, and yet provide the required electromagnetic forces at the output of the assembly.

And still another object of the present invention is to reduce the weight and expense of the electromagnetic strut assembly of the type described in the Prior Application.

And yet another object of the present is to provide an improved electromagnetic circuit for use in the strut assembly of the type described in the Prior Application.

And still another object of the present invention is to provide an improved active suspension system for a motor vehicle.

These and other objects of the present invention are achieved by an improved actuator assembly. The preferred embodiment o the assembly comprises a magnetic circuit for defining radially directed flux both in an inward and outward direction, and a coil disposed in the flux paths and connected to receive a control signal so that current can be applied in one direction through those portions of the coil disposed in the inward radially directed flux, and applied in the opposite direction through those portions of the coil disposed in the outwardly directed flux so that the flux/current products of the coil portions and associated flux are additive.

Other objects of the invention will in part be obvious and in part appear hereinafter. The invention accordingly comprises the apparatus possessing the construction, combination of elements, and arrangement of parts exemplified in the following detailed disclosure, and the scope of the application of which will be indicated in the claims.

For a fuller understanding of the nature and objects of the present invention, reference should be had to the following detailed description taken in connection with the accompanying drawings wherein.

In the drawings the same numerals are used to refer to like parts.

In general, the present invention utilizes magnetic circuit means for defining a magnetic circuit with multiple flux paths and current coils such that the flux/current products are additive so as to create a large concentration of flux in a relatively small area and thus provide an efficiently designed actuator. The magnetic circuit means is cooperative with a member so that the magnetic circuit means and member are movable relative to one another along an axis of relative movement in response to an electrical signal. The axis of relative movement will be linear when the actuator is designed as a linear actuator, or curved about a center of curvature when the actuator is designed as an angular actuator. The magnetic circuit means includes magnet means for establishing substantially constant flux through each of plurality of magnetically conductive cylindrical sections axially spaced relative to one another along the axis of relative movement so that flux is radially directed through some of the cylindrical sections in an inward radial direction and flux is radially directed through the other of the cylindrical sections in an outward radial direction.

Referring generally to the drawings, the preferred embodiment of the linear actuator assembly version of the present invention is particularly adapted for use as part of, and has significant advantages in an electromagnetic strut assembly in a motor vehicle, and will be described for purposes of illustration in that context, although it should be evident that the present invention has many other applications. Thus, in FIG. 1, the linear actuator system of the present invention is constructed as a strut assembly 10, for use at each wheel of a vehicle. As described in the Prior Application and illustrated in FIG. 1, a separate strut control system or processor 14 is used to control the operation of each strut assembly so as to maintain the chassis at a preselected orientation and position, preferably at its preset orientation and position level relative to level round.

Figure 1:
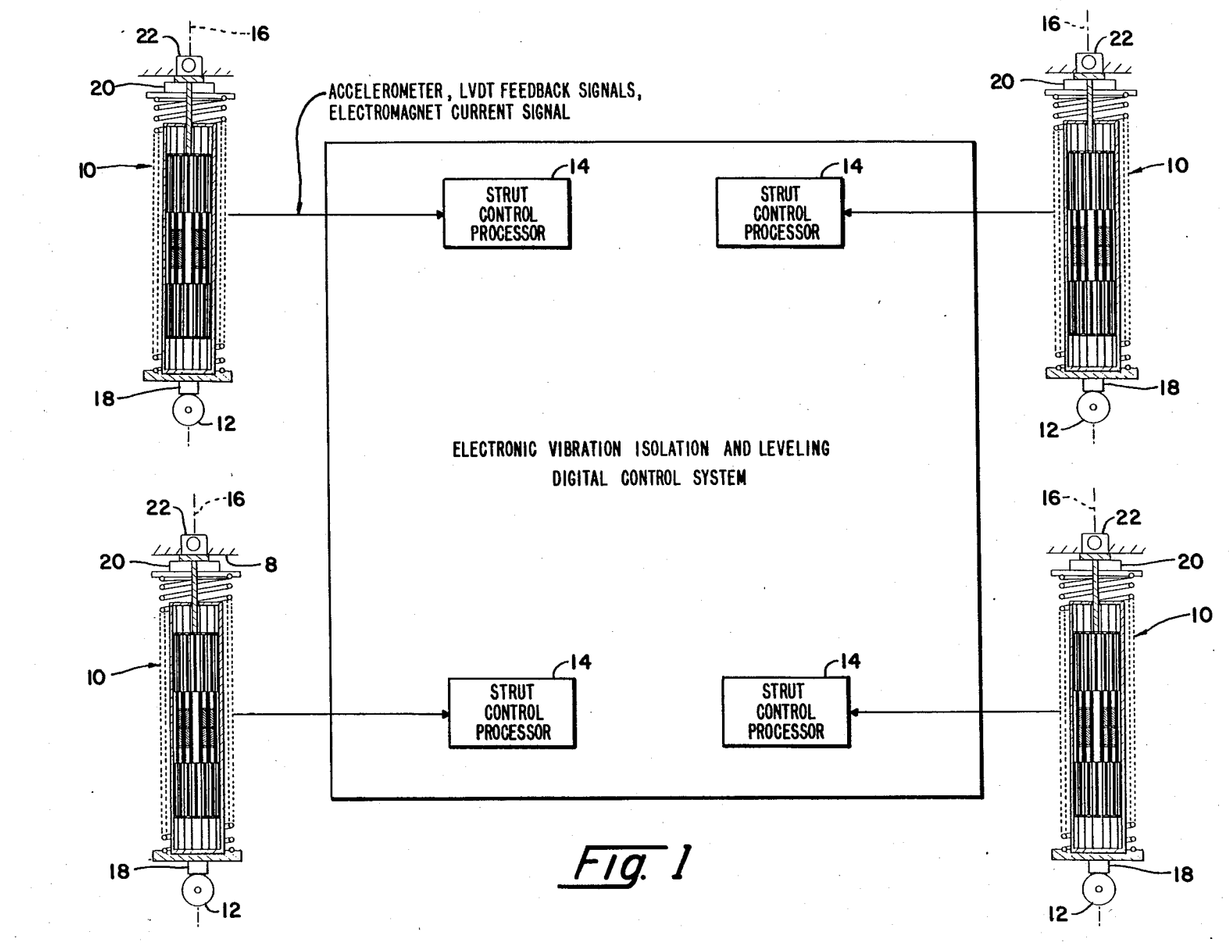
FIG. 1 is a block diagram of the active suspension system of the Prior Application modified to incorporate the present invention.
Figure 2:
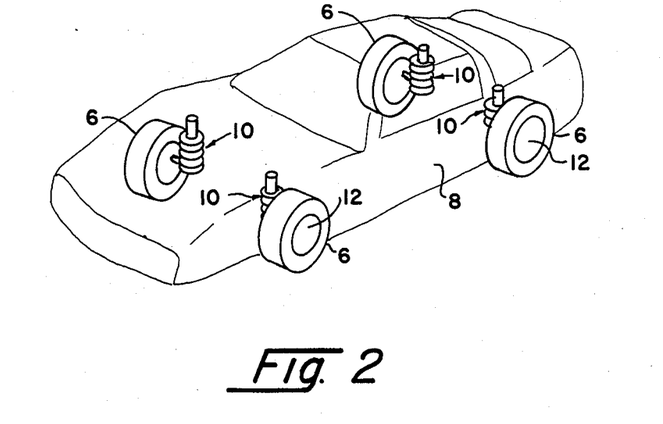
FIG. 2 is an outlined perspective view of an automobile equipped with the active suspension system comprising the present invention.

Generally, each strut assembly responds to an electrical control signal generated by the respective processor 14 in response to forces sensed along the center strut axis 16 of the corresponding strut assembly and the position of the frame relative to the wheel. The strut assembly 10 accordingly is additionally provided with sensing means, such as an LVDT 18, for sensing the relative positions of the wheel and frame of the chassis where the assembly is connected, and second sensing means, such as an accelerometer 20, for sensing forces externally applied to the assembly axially along the strut axis 16. Each strut assembly 10 is substituted for a shock absorber and corresponding coil spring of the type used in passive suspension systems so as to provide a four strut active suspension system as illustrated. Accordingly, a hub assembly 12 is provided at one end of the strut assembly 10 so that the latter can be connected to a respective wheel 6 and appropriate coupling means 22 for coupling the opposite end of the assembly 10 to the chassis 8 of the vehicle, as best shown in FIG. 2. It is believed that under normal requirements each assembly 10 and corresponding processor 14 can operate independently of one another. Under special circumstance, however, should the control of the relative position of each wheel 6 and chassis 8 be dependent on information sensed at one or more of the other wheels, the processors 14 can be networked in a manner well known in the art. The active suspension system is described in greater detail in the Prior Application and details of the improved strut assembly are described hereinafter.

The advantages of a linear actuator designed in accordance with the present invention over the linear actuator arrangement employed in the active suspension system described in the Prior Application will be evident from an analysis of the forces applied to a vehicle when the latter takes a turn and using those forces to determine the requirements of the electromagnetic linear actuator provided in the active suspension system and latter showing an equivalent linear actuator designed in accordance with the present invention and the resulting comparative advantages.

Figure 3:
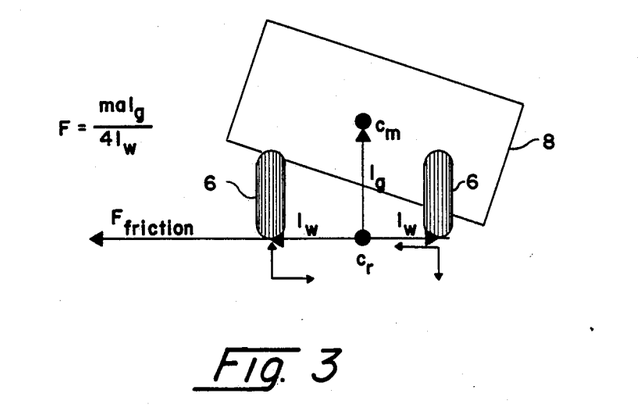
FIG. 3 shows a schematic view of an automobile subjected to external forces illustrating the need for the present invention.

More specifically, referring to FIG. 3, a simplified version of a force diagram illustrates the various forces applied to a vehicle when the latter makes a turn. Without an active suspension system, torque will be applied to the chassis 8 relative to the wheels 6 so that the chassis tilts as shown. As shown in the FIG. 3, $c_m$ represents the center of mass of the vehicle, while $c_r$ represents the roll center of the vehicle. The force formula indicated in FIG. 3 is derived in the following manner:

(1) $F_{friction} = mv^2/r = ma$ wherein "m" is the mass of the vehicle;
"v" is the velocity of the vehicle;
"r" is the radius of the turn the vehicle is performing; and
"a" is the lateral acceleration of the vehicle.

It is known that the roll moment can be defined as follows:

(2) Roll Moment = $F_{friction} * l_g$ wherein $l_g$ is the height of the center of mass from the ground.

The roll moment cancellation provided by the assemblies 10 is defined as follows:

(3) Roll Moment Cancellation = $4 * F_{strut} * l_w$ wherein
$F_{strut}$ is the sum of the restorative forces applied along the axis 16 of the assemblies 10 for maintaining the level and orientation of the chassis 8; and
$l_w$ is the distance from the center line of the vehicle to the center of any of the tire treads.

Since the roll moment cancellation must equal and oppose the roll moment in order to keep the vehicle level throughout a maneuver, equation (2) is made equal to equation (3).

(4) $F_{friction} * l_g = 4 * F_{strut} * l_w$ (5) $F_{strut} = (F_{friction} * l_g)/(4 * l_w)$ $$F_{strut} = (m * a * l_g)/(4 * l_w) \quad (6)$$

Thus, equation (6) can be used to determine the force which each strut would be required to exert in order to keep a vehicle level during a turning maneuver. For example, as indicated above, a 1988 Chevrolet Corvette weighs approximately 2800 pounds (1271.2 Kgms). The maximum amount of g force that can be produced by such a vehicle is about 0.91 g. $l_g$ is about 18.3 inches (0.4648 meters). 4 is placed in the denominator to correspond to the four wheels of the vehicle. Finally, $l_w$ is 30 inches (0.762 meters). Therefore:

$$\begin{aligned} F &= (1271.2 * 0.91 * 0.4648)/(4 * 0.762) \\ &= 176.41 \text{ kg (388.57 lbs)}. \end{aligned} \quad (7)$$

Converting to newtons:

$$(8) \quad 388.57 \text{ lbs} * 4.45 \text{ Newtons/lb} = 1729.14 \text{ Newtons}.$$

With the maximum strut force determined, the goal is to obtain a peak current in the coil assembly of the strut assembly (to be described hereinafter) (a) for providing the required force, and (b) easily supported by the current electrical system of a Corvette. A goal of a maximum 16 amps per strut was chosen. Since Lenz's Law is given by the following equation:

$$(9) \quad F = i(C*N) \times B$$

wherein
F=the strut force;
i=the current in the coil (in Amps)
C=the circumference of the coil (in meters);
N=the number of turns in the coil; and
B=the flux density (in Teslas);
amount of magnetic material easily can be determined as a function of the size of the coil (both in terms of its circumference and number of turns). Just as important is the weight constraints of the active suspension system. Constructing the strut assemblies as shown in the Prior Application with a single coil would provide a relatively heavy strut assembly requiring a relatively high level of current in which the magnetic material alone would weigh approximately 100 pounds. Preferably, the strut assemblies, in such a vehicle as a Corvette, should weigh as little as possible, so as to add as little mass as possible to the vehicle. Thus, the actuator assembly of the present invention is designed to provide the desired restorative forces with less magnetic material and less current than that provided by the type of strut assembly shown in the Prior Application, and at the same time keep the height of the strut assembly at a predetermined dimension.

The preferred embodiment of the linear actuator assembly as an electromagnetic strut assembly is shown in greater detail in FIGS. 4–7. The linear actuator generally includes the inner cylindrical assembly 30 (secured to support rod 68) and the outer cylindrical assembly 32 (secured to the support disk 36). The inner and outer cylindrical assemblies are cooperative so as to define an axis of relative movement 34 so that the inner assembly slides relative to the outer assembly along the axis 34. As will be seen in greater detail the two assemblies are movable relative to one another along the axis 34 in response to and as a function of a control signal.

The linear actuator is shown disposed in a strut assembly of the type described in the Prior Application. The strut assembly, generally indicated at 10 in FIG. 4, includes the inner and outer cylindrical assemblies 30 and 32. The outer cylindrical assembly 32 is fixed at one end to suitable means, such as the disk 36, for securing the outer assembly to the LVDT 18. The disk 36 is provided with an annular seat 38 for receiving one end of the coil spring 40. The assembly is suitably coupled to the frame of the vehicle as indicated by the hub assembly 12 so that the outer cylindrical assembly moves with the frame as the frame moves relative to the chassis along axis 34. The top end of the outer cylindrical assembly is provided with an aperture fitted with an annular bearing assembly 42.

The outer cylindrical assembly 32 includes a plurality of coil assemblies 44 (three being shown at 44a, 44b and 44c in FIG. 4) of wound electrically conductive wire suspended in the outer cylindrical assembly from the top and bottom of the assembly by any suitable means, such as stiff suspension members 46 made of electrically non-conductive material. The coil assemblies each include at least one layer of coil, and preferably a plurality of layers of coil, wound on a suitably stiff member(s) such that a portion of each coil assembly is physically exposed from the inside and outside of the assembly along an axial line so that the brushes 80 (best shown in FIG. 7) can electrically engage both sides of the coil assembly as the brushes move relative to the coils assemblies, as described in greater detail hereinafter. Accordingly, the stiff member can take the form of a stiff sleeve 47 (also best shown in FIG. 7) made of a suitable electrically non-conductive and magnetically- conductive material, such as a graphite composite. The sleeve can be provided with longitudinal slots 49 (see FIG. 5), running parallel to the axis 34, and sufficiently wide enough to allow brushes 80 t extend into the slots and engage the wire wound over the slot.. Each coil of each coil assembly is uniformly wound on the outer cylindrical surface of the corresponding sleeve with the same size wire. The suspension members 46 are preferably elongated elements disposed parallel to the axis 34.

The coil assemblies are preferably each of the same axial length, with the sleeve 47 being relatively stiff so that when supported by the member 46 the coil assemblies are relatively immovable, both axially and radially. The coil assemblies are suspended so that they are coaxial abut the axis 34, radially spaced from one another, and positioned along the axis 34 at the same axial positions so that the inner coil assembly 44a is positioned within the intermediate coil assembly 44b and the intermediate coil assembly is positioned within the outer coil assembly 44c.

Figure 6:
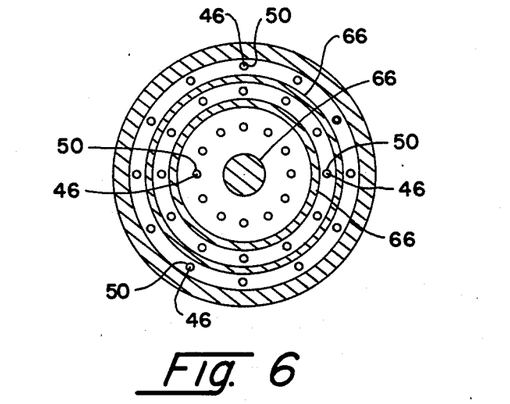
FIG. 6 is a cross-sectional view taken along line 6—6 in FIG. 4.

The inner cylindrical assembly 32 includes disks 48a and 48b respectively at the upper and lower of the assembly. As shown in FIG. 6, the disks are provided with a plurality of apertures 50 for respectively accommodating the suspension members 46 so that the inner cylindrical assembly can move axially along axis 34 relative to the coil assemblies 44 and members 46. The inner cylindrical assembly also preferably includes a center core member 52 disposed coaxially with the axis 34 within the coil assembly 44a, and an outer cylinder 56 disposed coaxially with the axis 34 outside the outer coil assembly 44c. Both core member 52 and cylinder 56 are made of a magnetically conductive material such as soft iron.

Figure 4:
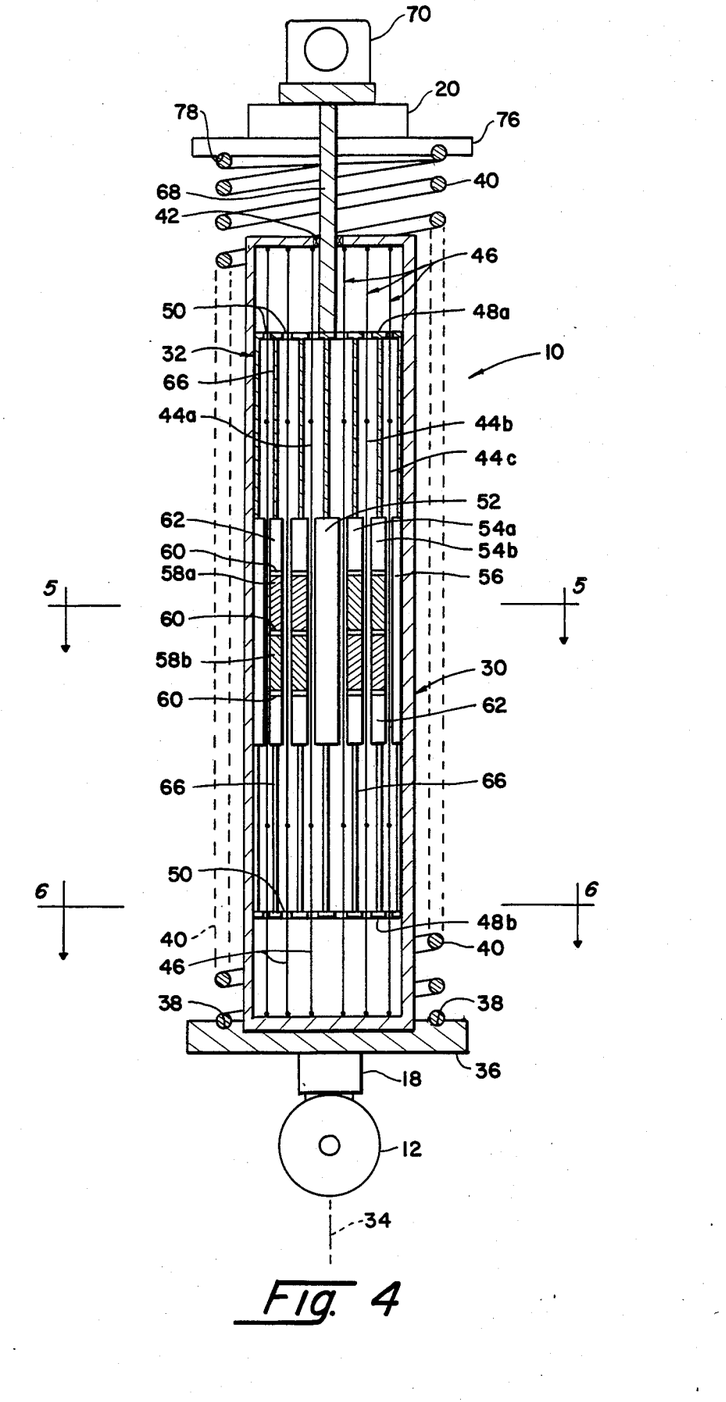
FIG. 4 is a cross sectional view of the preferred embodiment of the linear actuator of the present invention.
Figure 5:
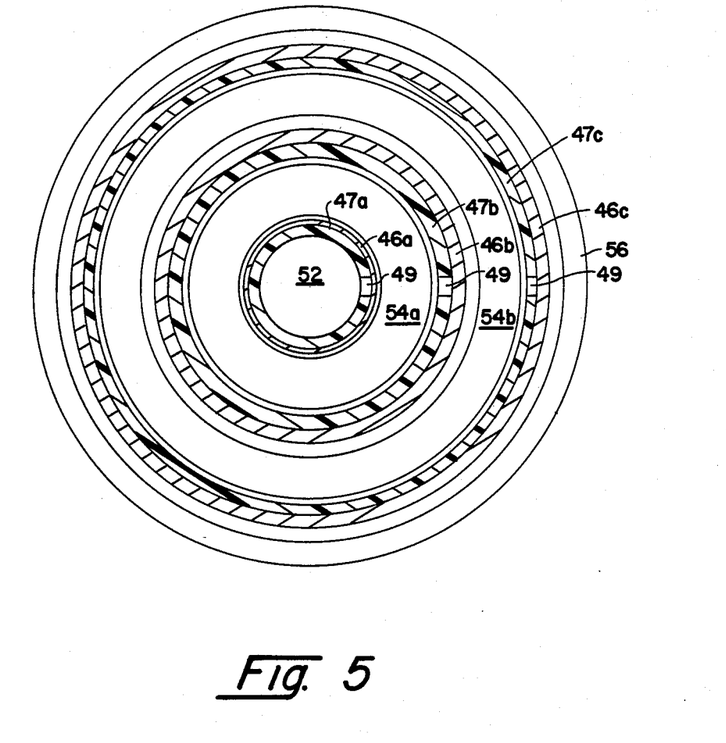
FIG. 5 is a cross-sectional view taken along line 5—5 in FIG. 4.
Figure 7:
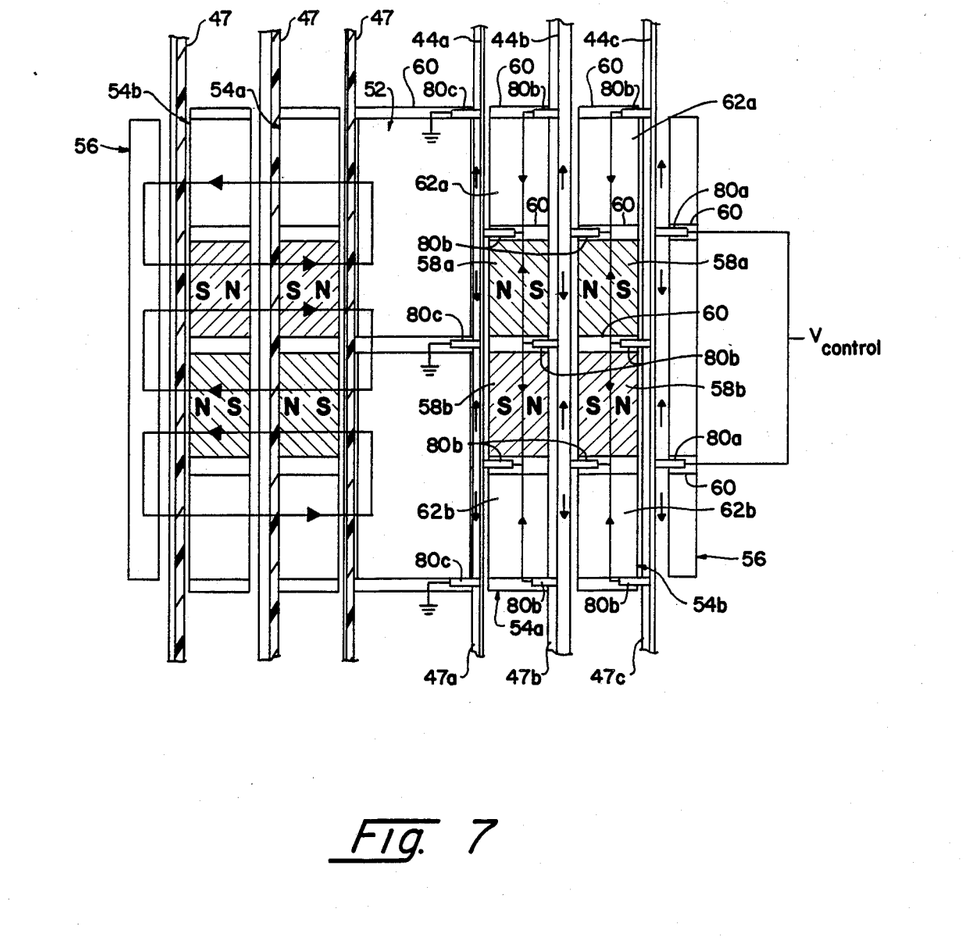
FIG. 7 is a detail cross-sectional view of the electromagnetic components of the linear actuator of FIG. 4.

In addition inner cylindrical assembly comprises intermediate cylinders 54a and 54b between the spaces between the coil assemblies so that, as shown, intermediate cylinder 54a is disposed between inner and intermediate coil assemblies 44a and 44b, and cylinder 54b is disposed between intermediate and outer coil assemblies 44b and 44c. The intermediate cylinders 54 include at least one and preferably a plurality of cylindrical magnets 58 made of a permanently magnetized material (as shown each includes a pair of cylindrical magnets, an upper cylindrical magnet 58a and lower cylindrical magnet 58b, each typically made of a relative a magnetic material providing a high flux density, such as neodymium-iron-boron or samarium cobalt). The magnets 58a and 58b are stacked axially one on top of the other, as shown in FIG. 4, and are separated by an annular ring 60 of magnetically nonconductive and electrically conductive material (such as aluminum), as best shown in FIG. 7. In addition, the intermediate cylinders 54 include cylindrical elements 62 disposed at the upper and lower ends of the cylinders on opposite sides of the magnets 58. The elements 62 are made of a magnetically conductive material and are also each separated from the adjacent cylindrical magnet 58 by annular rings 60 as best shown in FIG. 7.

As shown in FIGS. 4 and 6, the center core member 52, intermediate cylinders 54a and 54b and cylinder 56 are suspended in the inner cylindrical assembly 32 from the top and bottom disks 48a and 48b by any suitable means, such as stiff cylindrical suspension elements 66 made of electrically and magnetically non-conductive material, such as aluminum so that member 52 and cylinders 54 and 56 move together relative t the outer cylindrical assembly. The suspension elements 66 are also coaxially arranged with respect to the axis 34 and are fixed to the respective disks 48a and 48b between the apertures 50 so that the elements 66 do not interfere with the suspension elements 46 supporting the coil assemblies 44. The member 52 and cylinders 54 and 56 are all substantially of the same axial length and are suspended so that they are all coaxial with the axis 34 and radially spaced from one another. The member 52 and cylinders 54 and 56 are positioned along axis 34 at the same axial positions so that the inner core member 52 is positioned within the cylinder 54a, the latter is positioned within the cylinder 54b, while cylinder 54b is positioned within cylinder 56.

The axial length of the core member 52 and each of the cylinders 54 and 56 is dimensioned relative to the coil assemblies 44 so that (a) the length of each of the coil assemblies is equal to the length of the core member 52 (and cylinders 54 and 56) plus the required overall strut axial travel, as will be apparent hereinafter, and (b) the core member 52 and cylinders 54 and 56 are always disposed within the coil assemblies with a portion of coil assemblies 44a, 44b and 44c always disposed along the entire axial length of the core member and cylinders. Thus, a portion of coil assembly 44a is always disposed entirely between the core element 52 and the intermediate cylinder 54a for the entire axial length of the element and cylinder, a portion of coil assembly 44b is always disposed entirely between the intermediate cylinder 54a and intermediate cylinder 54b for the entire length of the two intermediate cylinders, and a portion of coil assembly 44c is always disposed between the intermediate cylinder 54b and the outer cylinder 56 for the entire length of the intermediate cylinder and the outer cylinder over the entire length of relative travel between the coil assemblies, and the cylinders and core member. The direction of the wire of the coil assembly, and therefore the current flowing through the coil wires, will always be parallel to the outer cylindrical surface of the core element 52, the inner and outer cylindrical surfaces of the intermediate cylinders 54a and 54b and the inner surface of the cylinder 56 (and thus perpendicular to any flux passing through those surfaces at a 90° angle, as will be apparent hereinafter).

When using the linear actuator as part of a strut assembly, the inner cylindrical assembly 32 is suitably coupled to the chassis 8 so that the assembly will move along the axis 34 with the chassis relative to the outer cylindrical assembly 30 when there is relative movement between the chassis and frame along axis 34. Preferably, rod 68 is fixed to the center of the upper disk 48 and extends through the bearing assembly 42 where it is suitably secured to the accelerometer 20 and the mounting bracket 70. The latter can be secured directly to the chassis.

A plate 76 is also fixed to the rod and includes an annular seat 78 for receiving the other end of the coil spring 40 so that the coil spring is under compression and provides an axial force between the inner and outer cylindrical assemblies 30 and 32 along the axis 34.

The structure for applying the control signal to control the relative positions between the inner cylindrical assembly and the outer cylindrical assembly, and the resulting electromagnetic circuits, is best shown in FIG. 7. More particularly, the axial length of the core member and cylinders 54 and 56 are divided into a plurality of sections separated by annular rings 60. Specifically, rings 60 are provided on the top and bottom of each of the core member 52 and cylinders 54 and 56. Rings 60 ar also provided at the center of the core member and at the center of the cylinders 54, between the magnets 58a and 58b. In addition, rings are provided between each of the magnets 58 and adjacent cylindrical elements 62, and in the cylinder 56 radially opposite the last mentioned rings of the cylinder 54. The core element and cylinders are thus divided into four cylindrical sections, axially stacked upon one another, which for purposes of illustration will be referred to as the first, second, third and fourth cylindrical sections numbered from the top.

Two primary control contact brushes 60a make point contact with the outer cylindrical surface of the coil assembly 44c at respective points between the first and second and between the third and fourth cylindrical sections. Relay brushes 80b are provided in the top, middle and bottom rings 60 of the cylinder 54b extending radially outward from the cylinder through the slot 49 of the sleeve 47c into contact with the inner surface of the coil assembly 44c. In a similar manner, relay brushes 80b are disposed in two rings between the first and second and third and fourth sections of the cylinder 54b, and extend radially inward and are urged into contact with the outer surface of the coil assembly 44b. Relay brushes 80b are disposed in the upper, middle and bottom rings 60 of the cylinder 54a and extend radially outward and are in point contact with the inner surface of the coil assembly 44b through the slot 49 of the sleeve 47b. Relay brushes are provided between the first and second and between the third and fourth sections of the cylinder 54a and extend radially inward into point contact with the outer surface of the coil assembly 44a. Finally, ground brushes 80c are disposed in the top, middle and bottom rings 60 of the core member and extend radially outward into the slot 49 of the sleeve 47a into contact with the inner surface of the coil assembly 44a. The brushes 80c are suitably connected to system ground. The primary control drive brushes 80a are suitably connected to receive the control signal. The brushes of cylinder 54a are connected together, as shown. Similarly, the brushes of cylinder 54b are connected together. As a result the control current flows from the brushes 80a to the brushes 80c through four series paths as indicated by the arrows in FIG. 7.

The brushes 80 will remain in contact with the respective coil assemblies regardless of the axial position of the inner cylindrical assembly within the outer cylindrical assembly. In this regard, the entire axial length dimension of each of the coil assemblies 44 is sufficiently long so that regardless of the position of the inner cylindrical assembly the brushes 80 will always be in contact with the coils of the respective coil assemblies.

The control voltage representative of the restorative force to be applied to the strut assembly 10 is applied to every other brush of each of the cylinders so that as shown the brushes 80a receive the control voltage. Where the linear actuator of the present invention is employed as a electromagnetic strut assembly for use in an active suspension system of the type described in the Prior Application, control voltage is derived in the same manner s described in the Prior Application. The control voltage signal can be applied through wires secured along the suspension elements 46, through apertures 50 and along the suspension elements 66 to the appropriate brushes 80a in a well known manner. The other ground brushes 80c are connected to system ground, also through suitable wiring similarly supported. In this way the electric current flowing through the section of the coil assembly between each pair of adjacent brushes of each cylinder will always be in one direction, with the direction of current reversing between adjacent sections. The flux through each of the four coil sections defined by the brushes 80 will also reverse direction between an inwardly radial direction toward the axis 34 and an outwardly radial direction away from the axis 34 so that the force applied to the core member 52 along axis 34, by the flux through and current in each coil section, as defined by Lenz's Law defined by equation (9), above, will be additive.

More specifically, since the direction of current reverses from coil section to coil section defined by the brushes with a corresponding change of direction of the flux B perpendicularly through each coil section the reverse magnitude of both will cancel so as to provide an accumulated force in the same direction along the axis 34. The accumulated force will be in an upward direction when the chassis is to be forced away from the frame, and in a downward direction when the chassis is to forced toward the frame.

In the preferred embodiment, the center core member 52, outer cylindrical member 56 and upper and lower cylindrical elements of the intermediate cylinders 54 are each preferably made of a magnetically conductive material such as iron and thus provide flux return paths for the cylindrical magnets 58. The magnets 58a and 58b are preferably made of a high permeability material producing a relatively high flux density and force, as for example, a neodymium iron boron alloy (NdFeB) or samarium cobalt. The brushes are disposed in rings 60 of a magnetically impermeable electrically conductive material, such as aluminum. The coil assemblies 44 are made of highly conductive wire of square cross section, such as 26 gage copper wire and preferably are wrapped around each side of a cylindrical coil sleeve 47 made of non-magnetic, electrically non-conductive material such as a suitable graphite composite. Preferably, more than one layer of coil is provided around each cylindrical coil sleeve, with the preferred embodiment providing two layers for inner coil assembly 44a, five layers for intermediate coil assembly 44b, and three layers for outer coil assembly 44c.

An example of a strut assembly constructed in accordance with the principles of the present invention includes a center core member 52 of a diameter of 2.5 cms. The inner intermediate cylinder 54a has an outer diameter of 5.57 cm. with a thickness of 1.25 cm. The outer intermediate cylinder 54b has an outer diameter of 9.49 cm. and a thickness of 1.25 cm. The outer cylinder 56 has an outside diameter of 11.59 cm. and a wall thickness of 0.625 cm. Each of the annular rings 60 is approximately 1.0 cm. in axial length. The axial length of the core member 52 and cylinders 54 and 56 are each 10 cms. The coil assemblies 44 are at least each 20 cms. in axial length to provide 10 cm. total travel so that the brushes 80 will always make contact with the corresponding coil assemblies regardless of the position of the inner cylindrical assembly 30 relative to the outer cylindrical assembly 32. The suspension elements 66 are each approximately 10 cms. in length so that entire length of the strut assembly 10 is 30 cms.

The preferred innermost coil assembly 44a includes two layers of wire with 465 turns each for a total of 930 turns. The intermediate coil assembly 44b has five layers of 465 wire turns each for a total of 2325 turns. Finally, the outer coil assembly 44c has three layers of 465 wire turns each for a total of 1395 turns.

As apparent from the above description and the drawings, not all of each of the coil assemblies has current flowing through the wires at any one time. The brushes 80 restrict the flow of current through the particular coil sections defined by the axial positions of adjacent brushes contacting each coil assembly. The coil sections of each assembly are within the 10 cms. disposed between the core member, intermediate cylinders and outer cylinder at any one time. Thus, as shown the 10 cm length is divided up into four flux areas, each of 2.35 cms. in axial length (after taking into account the annular rings 60). The top and bottom flux areas are iron-to-iron, while the two intermediate flux areas are iron-to-magnet as shown in FIG. 7.

The expected flux density between magnet and iron is approximately 0.9 Tesla, 0.75 Tesla between two pieces of iron, and 1.15 Tesla between two pieces of magnet. The width of each of the air gaps between the core member, the intermediate cylinders and the outer cylinder is determined by multiplying the number of layers by the diameter of the wire and a factor of 1.1 in order to provide sufficient room. The number of turns per layer in a 2.35 cm length is 58.75. Therefore, in the example given, the length of wire of each coil assembly for each flux area can be easily calculated by multiplying 58.75 by the number of layers of the coil assembly, pi, and the inner diameter of the coil assembly. Thus, for the inner coil assembly 44a the coil length is calculated as (58.75 * 2 * pi * 0.0278 = 10.26 m., for the intermediate coil assembly 44b, the coil length is calculated as (58.75 * 5 * pi * 0.0628=) 57.95 m., while for the outer coil assembly 44c the coil length is calculated as (58.75 * 3 * pi * 0.0991=) 54.9 m.

Using the above values the maximum amount of current per strut assembly can be easily calculated using Lenz's Law defined in equation (9) above. For the inner coil assembly the cross product L×B is calculated by adding together the L×B cross product in all four flux areas:

(L×B)₁ = 10.26 (m) * (0.75+0.9+0.9+0.75 (Tesla)) = 33.86

For the intermediate coil assembly the product L×B is similarly calculated:

(L×B)₂ = 57.95 (m) * (0.75+1.15+1.15+0.75 (Tesla)) = 220.21.

For the outer coil assembly the product L×B is calculated as follows:

(L×B)₃ = 54.9 (m) * (0.75+0.9+0.9+0.75 (Tesla)) = 181.17.

By summing the values of L×B for the three coil assemblies, the coil current can then be determined for the maximum force of 0.91 g $$i = F(\text{newtons})/((L \times B)_1 + (L \times B)_2 + (L \times B)_3)$$
$$= 1729.14/435.24$$
$$= 3.97 \text{ amps.}$$

As shown in FIG. 7, there are four parallel coil circuits, each requiring 3.61 amps. The total current required is then:

3.61 amps × 4 = 15.89 amps.

Thus, the peak current of 15.89 amps per strut assembly is needed in order to keep a Corvette level to the road through a 0.91 g turn, within the 16 amp limit described above. Based on the above dimensions the size of each element of the strut assembly can be determined and the weight of the strut assembly calculated. It was initially determined that the entire weight of the strut assembly is approximately 27.67 kg, with the weight of the magnets contributing 1.44 kg. This results in a substantial reduction in the amount of current required to provide the necessary restorative forces. In addition, the amount of magnetic material, and therefore the overall costs and weight of the linear actuator, are reduced by having the core member and cylinders 54 and 56 constructed so that they move together (as opposed to having the core member moveable relative to the magnetic material as provide in the linear actuator of the active suspension system of the Prior Application).

It should be appreciated that the while the linear actuator assembly has been described as a strut assembly for use in a vehicle, the assembly has many other applications where a relatively large output force is provided by the force transmitting member (core member 52) in response to a relatively small current. In such other applications the LVDT 18 and accelerometer 0 may be omitted and the control current derived in a manner depending upon the particular application. In addition, any suitable means can replace the coupling means 22 and hub assembly 12, for coupling the opposite ends of the linear actuator assembly 10 between two objects, depending on the application of the actuator assembly.

Figure 8:
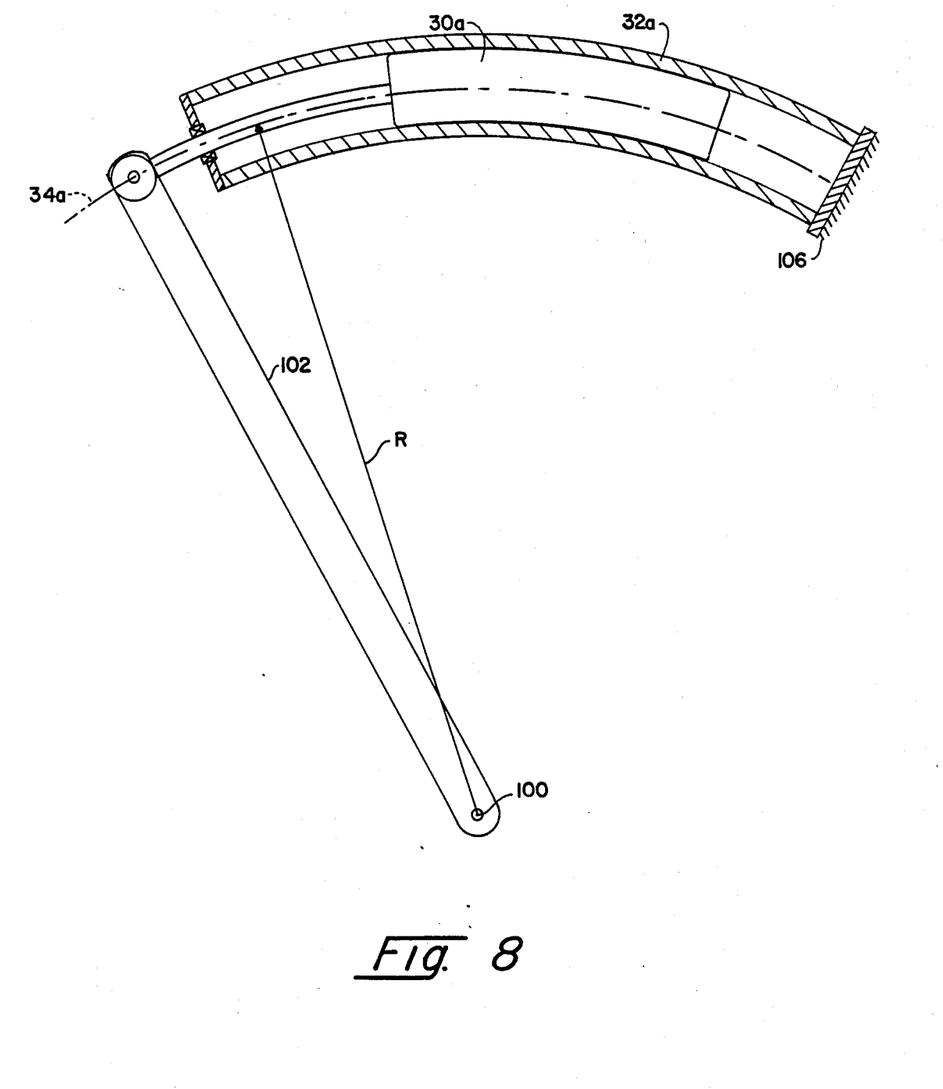
FIG. 8 is a cross sectional view of the preferred embodiment of the angular actuator of the present invention.

In addition the actuator assembly can be designed to provide a torque as in the case of an angular actuator. As shown in FIG. 8, such an angular actuator would be substantially identical to the linear actuator, except that the axis of relative movement 34a and all of the parts of the actuator are designed to curve about a center of curvature 100 at a radial distance R. The angular actuator can easily be used for example to rotate a lever arm 102 about an axis 104 (normal to the plane of FIG. 8), by attaching the arm to one of the cylindrical assemblies 30a or 32a of the angular actuator (shown in the drawing as being attached to assembly 30a) and having the other cylindrical assembly fixed to a base structure 106. The control signal can then be used to control the amount of relative movement of the inner and outer cylindrical assemblies 30a and 30b along the axis 34a.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. An actuator assembly comprising:
   (A) a first member defining an axis of relative movement;
   (B) magnetic circuit means for defining a magnetic circuit, said magnetic circuit means being movable relative to said first member along said axis, wherein said magnetic circuit means includes magnet means for establishing substantially constant flux through each of a plurality of magnetically conductive cylindrical sections axially spaced relative to one another along said axis so that flux is radially directed through at least one of said cylindrical sections in an inward radial direction and flux is radially directed through the other of said cylindrical sections in an outward radial direction;
   (C) at least one electrically conductive coil assembly including at least one coil having a plurality of turns, said coil being coaxially positioned with said axis and extending through said radially directed flux of each of said cylindrical sections so that (i) a portion of said coil extends through the radially directed flux from each corresponding cylindrical section, and (ii) the current flowing through turns of each said portion of said coil flows substantially perpendicular to the corresponding radially directed flux; and
   (D) means for applying a control signal to the portion of tee coil extending through the flux from each of the sections so that (a) the direction of the flow of current of the control signal through the portions of the coil extending through the flux directed in an inward radial direction is opposite to the direction of current of the control signal through the portions of the coil extending through the flux directed in an outward radial direction and (b) the force applied along the axis between the first member and said magnetic means in response to the flux/current cross-product of each of the cylindrical sections and corresponding portions of coil are additive.

2. An assembly according to claim 1, wherein said magnet means are disposed so that said flux is radially directed through said cylindrical sections in directions which alternate between an inward radial direction and an outward radial direction between adjacent cylindrical sections.

3. An assembly according to claim 2, wherein said magnet means includes at least two cylindrical magnets axially spaced from one another along said axis, wherein the north and south poles of each of said magnets are radially spaced from one another.

4. An assembly according to claim 3, wherein said magnetic circuit means further includes at least two cylindrical magnetically conductive elements each being axially positioned adjacent a corresponding one of said magnets so as to define a return flux path for the flux generated by the corresponding magnet.

5. An assembly according to claim 4, wherein said one coil is at least partially disposed within said cylindrical sections between said sections and said first member, and said coil assembly includes at least one other coil having a plurality of turns, said one other coil being coaxially positioned with said axis and said cylindrical sections being disposed within said other coil, said one other coil at least partially extending through radially directed flux of each of said cylindrical sections so that (i) a portion of said one other coil extends through the radially directed flux from each corresponding cylindrical section, and (ii) the current flowing through turns of each said portion of said one other coil flows substantially perpendicular to the corresponding radially directed flux.

6. An assembly according to claim 5, further comprising a cylindrical element disposed coaxial with said axis around at least a part of said one other coil, said cylindrical element including magnetically conductive material for defining a return path for said flux directed in an outward radial direction.

7. An assembly according to claim 6, wherein said magnetic circuit means includes a core element of a magnetically conductive material for defining a return path for said flux directed in an inward radial direction.

8. An assembly according to claim 7, wherein said means for applying said control signal includes a plurality of brushes secured to said magnetic circuit means and positioned so that a pair of brushes contact opposite ends of each of said portions of said coil so as to determine the direction of flow of said current through each of said portions of said coil.

9. An assembly according to clam 1, wherein said said magnetic circuit means includes second magnet means for establishing substantially constant flux through each of a second plurality of magnetically conductive cylindrical sections axially spaced relative to one another along said axis and radially spaced from the corresponding plurality of magnetically conductive cylindrical sections so that flux is radially directed through some of said cylindrical sections of said second plurality in an inward radial direction coincident with the corresponding inwardly radially directed flux provided by said first magnet means and flux is radially directed through the other of said cylindrical sections of said second plurality in an outward radial direction coincident with the corresponding outwardly radially directed flux provided by said first magnet means.

10. An assembly according to claim 9, wherein said first and second magnet means each includes at least two cylindrical magnets axial spaced from one another along said axis with the two magnets of said first magnet means being radially spaced from the two corresponding magnets of said second magnet means, wherein the north and south poles of each of said magnets are radially spaced from one another.

11. An assembly according to claim 10, wherein said magnetic circuit means further includes at least two cylindrical magnetically conductive elements each being axially positioned adjacent a corresponding one of said magnets of each of said first and second magnet means so as to define a return flux path for the flux generated by the corresponding magnet.

12. An assembly according to claim 11, wherein said one coil is at least partially disposed within said cylindrical sections of said first magnet means between said cylindrical sections and said first member, and said coil assembly includes at least two other coils having a plurality of turns, said two other coils being coaxially positioned with said axis so that at least part of one of said other coils is disposed between said first and second magnet means and the cylindrical sections of said first and second magnet means are disposed within the second of said other coils, both of said other coils at least partially extending through said radially directed flux of said cylindrical sections so that (i) a portion of said each of said other coils extends through the radially directed flux from a corresponding cylindrical section of said first and second magnet means, and (ii) the current flowing through turns of each said portion of said other coils flows substantially perpendicular to the corresponding radially directed flux.

13. An assembly according to claim 12, further comprising a cylindrical element disposed coaxial with said axis around at least a part of said two other coils and said first and second magnet means, said cylindrical element including magnetically conductive material for defining a return path for said flux directed in an outward radial direction.

14. An assembly according to claim 13, wherein said magnetic circuit means includes a core member comprising magnetically conductive material for defining a return path for said flux directed in an inward radial direction.

15. An assembly according to claim 1, further including means for coupling said coil assembly to said first member so that said coil assembly is movable relative to said magnetic circuit means.

16. An assembly according to claim 1, wherein said magnetic circuit means and said first member are constructed so as to be movable relative to said first member along said axis of relative movement so that said axis is curved about a center of curvature at a distance R from said center so that said assembly functions as an angular actuator.

17. An assembly according to claim 16, wherein said magnetic circuit means and said first member are constructed so as to be movable relative to said first member along said axis so that said axis is linear and said assembly functions as a linear actuator.

18. An actuator assembly comprising:
a first assembly;
a second assembly movable relative to said first assembly for a predetermined length along an axis of relative movement; and
means for applying a control signal to said actuator assembly for controlling the relative movement of said first and second assemblies;
wherein said first assembly includes at least one electrically conductive coil mounted substantially coaxial to said axis and having an axial length at least equal to said predetermined length;
said second assembly includes magnetic circuit means for defining a magnetic circuit, said magnetic circuit means being movable relative to said coil along said axis of relative movement, wherein said magnetic circuit means includes magnet means for establishing substantially constant flux through each of a plurality of cylindrical sections of said coil axially space relative to one another along said axis so that flux is radially directed through at least one of said cylindrical sections of said coil in an inward radial direction and flux is radially directed through the other of said cylindrical sections of said coil in an outward radial direction, and said means for applying said control signal applies said control signal to said cylindrical sections of said coil so that (a) the direction of the flow of current of the control signal through the cylindrical sections of the coil extending through the flux directed in an inward radial direction is opposite to the direction of current of the control signal through the cylindrical sections of the coil extending through the flux directed in an outward radial direction and (b) the magnetic force applied between said first and second assemblies along the axis in response to the flux/current cross-product provided by each of the cylindrical sections of the coil and corresponding flux are additive.

19. An actuator assembly comprising:

a first assembly; and a second assembly movable relative to said first assembly along an axis of relative movement in response to a control signal, said second assembly comprising magnetic circuit means for defining radially directed flux both in an inward and outward direction relative to said axis of relative movement, and a coil disposed in the flux paths; and means for applying said control signal to said coil so that a current can be applied in one direction through those portions of the coil disposed in the inward radially directed flux, and applied in the opposite direction through those portions of the coils disposed in the outwardly directed flux so that the flux/current force applied between said first and second assemblies is additive.

* * * * *

UNITED STATES PATENT AND TRADEMARK OFFICE
CERTIFICATE OF CORRECTION

PATENT NO. : 4,912,343

DATED : March 27, 1990

INVENTOR(S) : Keith O. Stuart

It is certified that error appears in the above-identified patent and that said Letters Patent is hereby corrected as shown below:

Claim 1, column 12, line 47, delete "tee" and substitute therefor -- the --;

Claim 5, column 13, line 16, after "through" insert -- said --;

Claim 9, column 13, line 41, delete "said" (second occurrence);

Claim 10, column 13, line 59, delete "axial" and substitute therefor -- axially --;

Claim 11, column 13, line 68, after "one" insert -- of--;

UNITED STATES PATENT AND TRADEMARK OFFICE
CERTIFICATE OF CORRECTION

PATENT NO. : 4,912,343

DATED : March 27, 1990

INVENTOR(S) : Keith O. Stuart

It is certified that error appears in the above-identified patent and that said Letters Patent is hereby corrected as shown below:

Claim 18, column 15, line 2, delete "space" and substitute therefor -- spaced --; and Claim 18, column 15, line 7, delete "," and substitute therefor -- ; --

Signed and Sealed this

Twenty-sixth Day of March, 1991

*Attest:*

HARRY F. MANBECK, JR.

*Attesting Officer*   *Commissioner of Patents and Trademarks*